March 14, 1939.  P. M. ADAMS  2,150,143
AIRCRAFT CONSTRUCTION
Filed Oct. 29, 1936  3 Sheets-Sheet 1
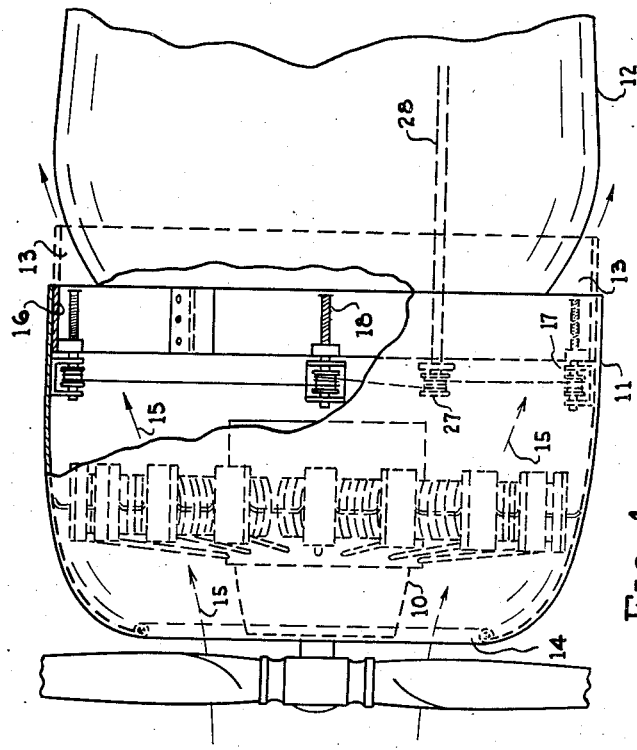
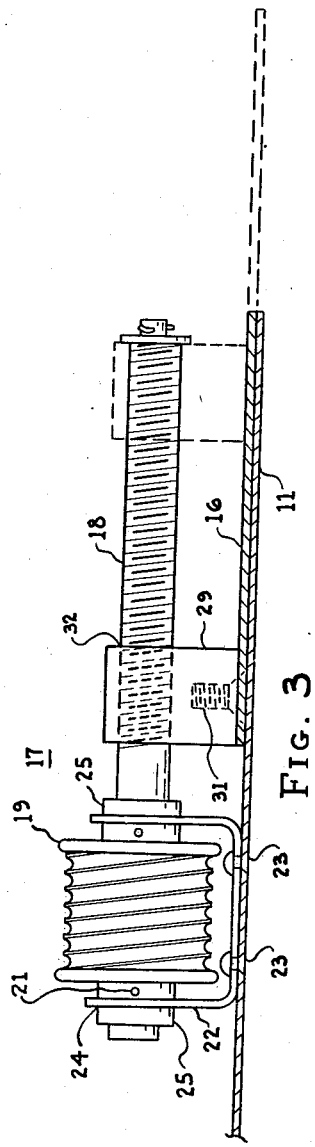
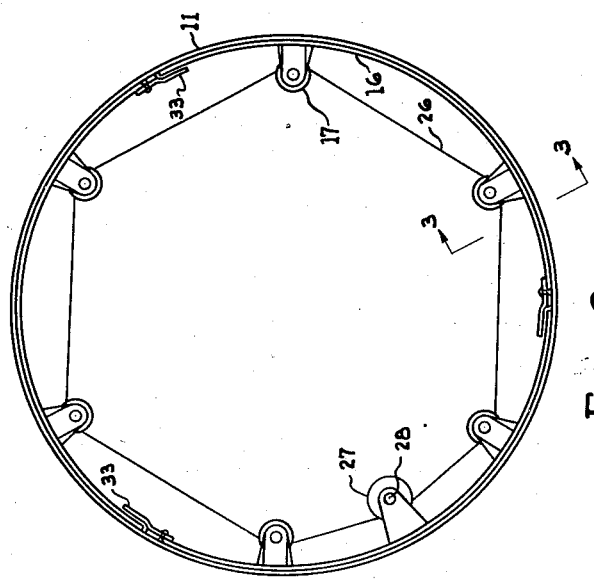
INVENTOR.
PARKS M. ADAMS
BY
ATTORNEY.

March 14, 1939.   P. M. ADAMS   2,150,143
AIRCRAFT CONSTRUCTION
Filed Oct. 29, 1936   3 Sheets-Sheet 2
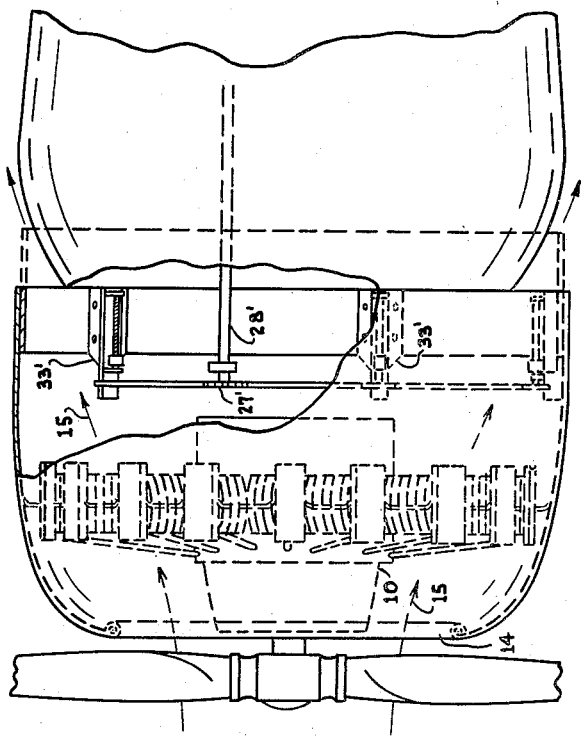
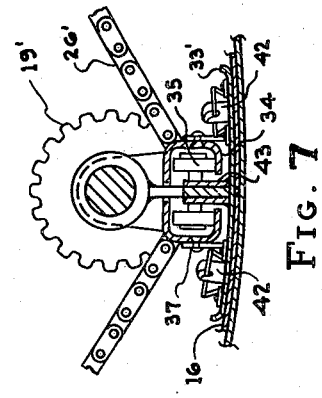
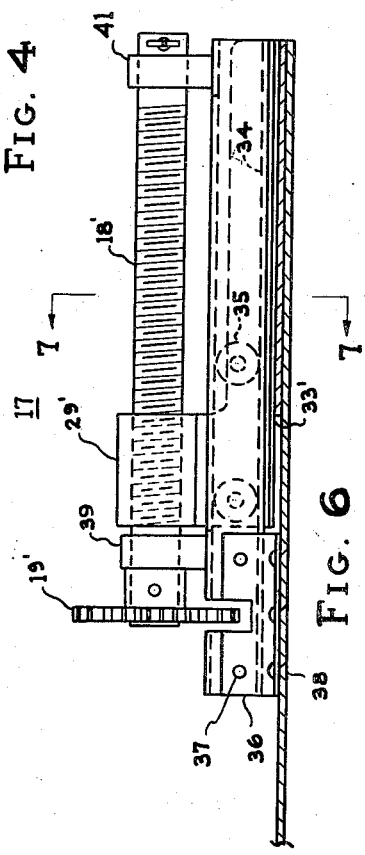
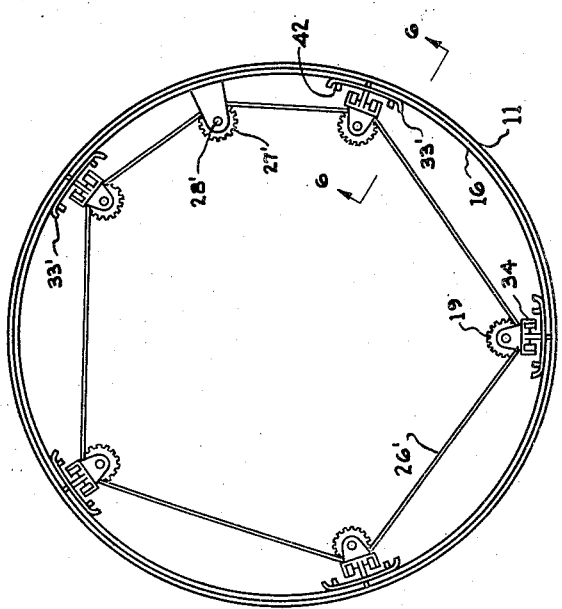
INVENTOR.
PARKS M. ADAMS
BY
ATTORNEY.

March 14, 1939.  P. M. ADAMS  2,150,143
AIRCRAFT CONSTRUCTION
Filed Oct. 29, 1936  3 Sheets-Sheet 3
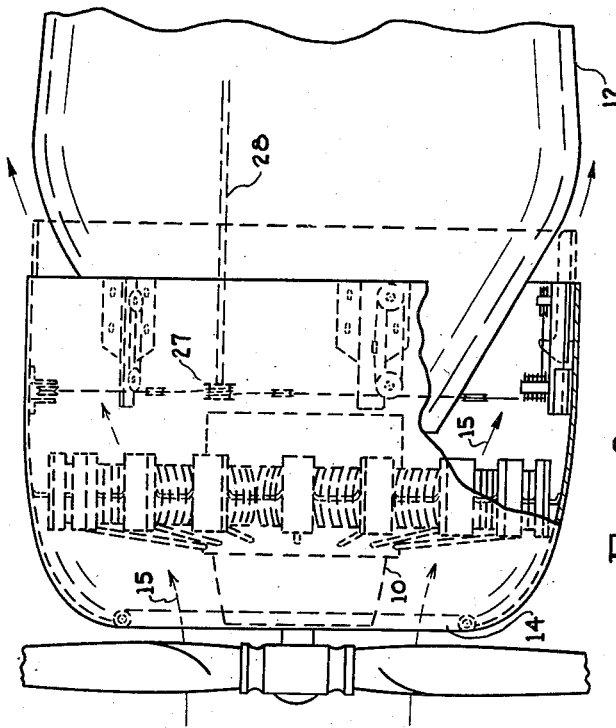
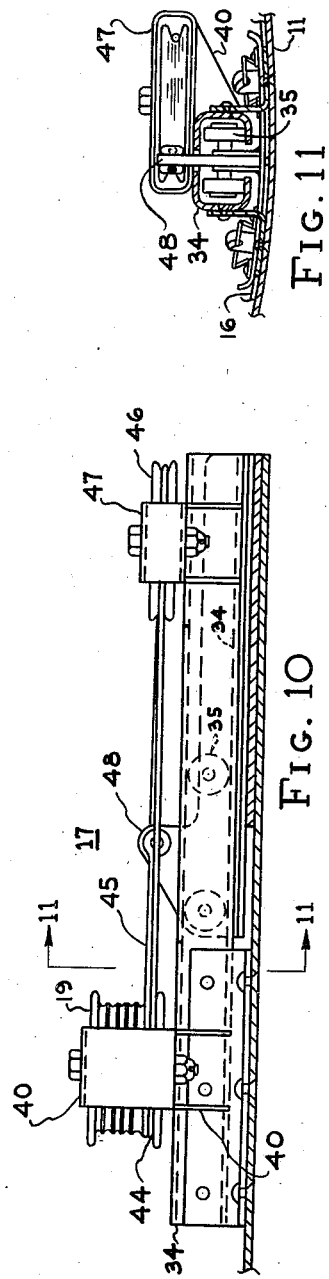
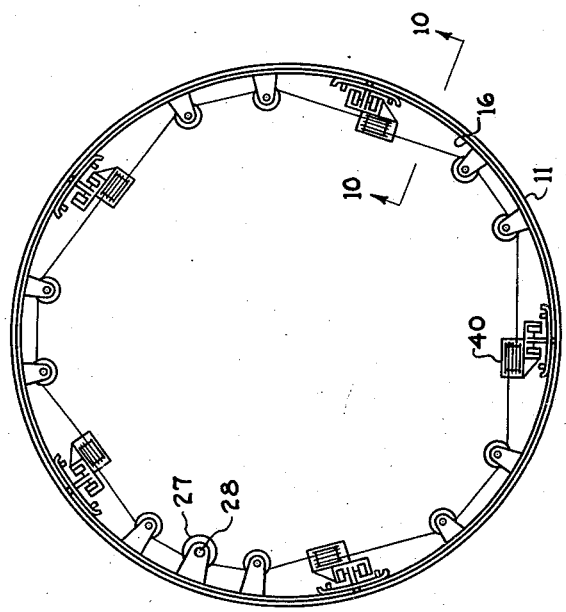
INVENTOR.
PARKS M. ADAMS
BY
ATTORNEY.

Patented Mar. 14, 1939

2,150,143

UNITED STATES PATENT OFFICE 2,150,143

AIRCRAFT CONSTRUCTION

Parks M. Adams, Baltimore, Md., assignor to The Glenn L. Martin Company, Baltimore, Md.

Application October 29, 1936, Serial No. 108,207

3 Claims. (Cl. 244—55)

This invention relates to aircraft constructions and more particularly to an improved engine or ring cowling.

It is one object of this invention to provide a novel cowling for aircraft engines that will be readily and easily adjusted for regulating the amount of cooling air contacting the cylinders of an air cooled engine or the radiator of a water cooled engine.

Another object is to provide a cowling for an aircraft engine of improved construction that shall be positive in operation and sufficiently rugged to withstand the various pressures and strains to which it is subjected in use.

Another object is to provide an engine cowling having the above characteristics that shall operate within the external slipstream about the cowling and thereby preclude any additional drag when the cowling is adjusted to regulate the cooling air.

Another object is to provide a novel means for positively adjusting the cowling during flight that shall be operable by the pilot for controlling the drag through the engine at cruising and high speeds.

A further object is to provide an adjustable engine cowling that shall eliminate the drag set up by the conventional cowling gill construction.

A still further object is to provide an engine cowling having a novel skirt that can be adjusted for regulating the cooling of the engine as well as the air drag therethrough without objectionably interfering with the slipstream.

The above and other objects will be made apparent throughout the further description of the invention when taken in connection with the accompanying drawings wherein like reference characters refer to like parts. It is to be distinctly understood that the drawings are not a definition of the invention but are merely certain forms illustrating how the invention can be effectuated. The scope of the invention is defined by the appended claims.

In the drawings:

Figure 1 is a fragmentary view in elevation of nacelle and engine cowling having a portion broken away for illustrative purposes.

Figure 2 is a rear end view of the engine cowling shown in Figure 1.

Figure 3 is a detail sectional view taken along the line 3—3 of Figure 2.

Figures 4, 5, and 6 are views similar to Figures 1, 2, and 3 illustrating another embodiment of the invention.

Figure 7 is a detail sectional view taken along the line 7—7 of Figure 6, and

Figures 8, 9, 10, and 11 are views similar to Figures 4, 5, 6, and 7 illustrating still another embodiment of the invention.

In the drawings, Figures 1, 2, and 3 illustrate one form of the invention wherein there is shown for the purpose of illustration a radial aircooled engine 10 having a ring cowling 11 disposed about the engine and supported in a conventional manner. 12 indicates the front end of a fuselage or nacelle which is formed to provide the usual annular opening 13 between the rear end of the cowling and the adjacent surfaces of the nacelle.

In the form shown the air for cooling the engine accessories and the like enters the opening 14 provided in the front end of the cowling 11 and passes through and around the heated surfaces to be cooled and out the opening 13 as indicated by the arrows 15.

For the purpose of controlling the flow of air sweeping or passing through the engine there is here provided a novel skirt or cowl extension 16 adapted to open or close the opening or air passageway 13. The adjusting or regulating of the amount of air passing through the opening 13 has presented a very serious problem to the trade due to the particular location of the opening 13. Various kinds of shutters or flaps have been provided on the trailing and leading edges of cowlings for increasing or decreasing the amount of cooling air passing through the engine but all of those known to me not only seriously interfere with the slipstream and induce additional drag but the pressure on these flaps or shutters is of such magnitude as to render their proper operation by the pilot very difficult and in addition requires complicated and bunglesome controls. The present cowl extension or skirt 16 is so constructed as to overcome these difficulties.

In the preferred form, the skirt 16 is annular in shape and is adapted to telescope within the rear edge of the cowling 11. The skirt 16 is disposed in coaxial relation with the cowling 11 and has an external diameter that will permit it to slide easily but snugly into telescopic relation with the cowling 11.

Novel means represented in its entirety by 17, is provided for actuating the skirt 16. One form of the means 17 as shown in Figures 1 to 3, inclusive, consists of a plurality of longitudinally extending worm shafts 18 disposed radially about the inner rear surface of the cowling 11. The forward end of each of these worm shafts is provided with a drum or sheave 19 rigidly fixed thereon by suitable means such as shown at 21. The worm shafts are supported by the associated sheaves 19 the latter being mounted radially about the inner surface of the cowling 11 by means of U-shaped supports 22. These supports 22 are preferably attached to the inner surfaces of the cowling 11 at points adjacent the innermost position of the skirt 16. Each of the U-shaped supports is fixed to the cooperating cowling surface by suitable means such as countersunk rivets 23. The legs of the U-shaped supports are provided with bearing openings 24 for receiving and cooperating with the shank or hub member 25 of the sheaves.

The several sheaves are interconnected by an endless cable 26, the latter being adapted to rotate the sheaves 19 simultaneously and in the same direction. An actuating sheave 27 is inserted in the cable line and provided with a rod or shaft 28 which connects to control means (not shown). It is to be understood that the rod 28 may be manually operated by the pilot or that suitable automatic means may be provided, such as an electric motor operated by a thermostat associated with the engine to be cooled.

The skirt 16 is operably connected to the means 17 by means of inwardly extending projections 29. These projections 29 are rigidly fixed to the cooperating inner surface of the skirt or band 16 by any suitable means such as shown at 31. Each of the members 29 is provided with a threaded opening 32 therethrough adapted to receive the worm portion of the cooperating shaft 18.

It can now be understood that as the sheaves 19 are rotated simultaneously and in the same direction that the several threaded projections 29 will travel along their respective worm shafts 18 and since the projections 29 are fixed to the skirt 16 the latter will be moved inwardly or outwardly with respect to the cowling and open or close the air passageway 13. It will be noted that the skirt 16 will move substantially parallel with the slipstream and thereby avoid any objectional drag. It will also be noted that while the moveable skirt 16 is light of weight but rugged that it is protected at all times from the major portions of external strains by the associated parts of the cowling 11.

The cable 26 extends around each of the sheaves 19 for several turns in order to assure positive simultaneous operation of the sheaves and provide sufficient rotation of the worm to move the skirt the required maximum distance. The cable 26 is preferably fixed to each of the sheaves in order to preclude any slipping of the cable relative to the sheave.

The skirt 16 may be constructed so as to comprise a plurality of segments and means 33 provided for holding the adjacent edges of the segments in proper aligned position and yet provide for any necessary relative movement between the segments that may be required for proper operation of the means 17. The means 33 may comprise a metallic strip extending the length of the skirt and having one of its sides fixed to the inner surface of the skirt segment adjacent one of the side edges of the skirt segments. The free side of the strips is formed to provide a groove to receive and support the side edge of the adjacent segment.

Figures 5 to 7, inclusive, illustrate another embodiment of the invention wherein the means 17 employs sprockets 19' and a chain 26' instead of the sheaves 19 and cable 26. In this embodiment a plurality of tracks 34 are provided for carrying trucks 35. The tracks 34 are disposed radially about the rear inner surface of the cowling 11 and are supported at their forward ends by angular clips 36 fixed to the tracks and the cooperating inner surface of the cowl 11 by fastening means 37 and 38, respectively.

Each of the sprockets 19' is fixedly mounted on the forward end of a worm shaft 18', the latter being turnably supported adjacent each of its ends by bearing projections 39 and 41 extending inward and carried by the forward and rear ends respectively of the track 34. The truck 35 is fixed to the skirt 16 and in this particular embodiment each of the trucks 35 is fixed to strips 33' here employed to fasten the adjacent sides of the skirt segments in rigid fixed relation. The strips 33' are fixed to the adjacent inner sides of the skirt segments by means 42 and the body of the truck 35 is fixed to the forward end of the strip 33' as shown at 43 (see Figure 7), the members or means 43 may be welded or otherwise fastened to the strips 33' and the associated truck 35. Each of the trucks 35 also carries a threaded member 29', the latter being adapted to receive and cooperate with the associated worm shaft 18'.

For the purpose of operating the means 17 there is provided a sprocket 27' turnably supported on the inner surfaces of the cowling 11 and in operable engagement with the chain 26'. An actuating shaft 28' is provided for connecting the sprocket 27' with the pilot or automatic control.

Figures 8 to 11, inclusive, illustrate still another embodiment of the invention wherein a different means is employed for operating the truck 35. This embodiment as illustrated employs the cable 26 and the sheaves 19 described in connection with Figures 1 to 3, inclusive, except that the sheaves are supported on the forward end of the tracks 34 of Figures 5 to 7, inclusive, as shown at 40. Also each of the sheaves 19 in this embodiment may be provided with a separate groove or grooves 44 for accommodating an independent cable 45, the latter extends around a pulley 46 supported by the other or rear end of each of the tracks 34 as shown at 47. The groove 44 may not in every case be of sufficient diameter to provide the required linear motion of cable 45 for moving the truck 35 to open and close positions. Therefore, it is to be understood that a plurality of grooves 44 may be employed instead of the single groove 44 shown. One side of each of the cables 45 is fixed to the associated truck 35 as shown at 48 so that as the sheaves 19 are rotated the trucks will be moved along the tracks 34 and since the trucks 35 are fixed to the skirt 16 the latter will be moved in accordance with the direction the sheaves are rotated.

The means 17 may include any number of sheaves or sprocket wheels and its associated mechanism as may be required to render proper opening and closing of the skirt 16. Idle pulleys or sprocket wheels 50 as shown in Figure 9 may be employed for supporting the cable 26 or chain 26' between the several sheaves 19 or sprocket wheels 19'.

The operation of the present device is as follows: The actuating shaft 28 or 28' is turned in the direction desired by the pilot or an automatic means for opening or closing the passageway 13. The actuating shaft will rotate the sheave 27 or sprocket 27' which will in turn cause the cables 26 or chain 26' to rotate the sheaves 19 or sprockets 19' simultaneously and in the same relative directions. These sheaves 19 or sprockets 19' being operably connected to the worm shafts 18 or 18' will rotate the latter and cause the threaded projection 29 or 29' to travel longitudinally of the worm. Since the threaded means 29 are carried by the skirt 16 and the threaded means 29' are connected to the skirt 16 through the trucks 35 it follows that the skirt will be moved forwardly or rearwardly relative to the cowl 11 as the threaded means 29 or 29' moves along the worms 18 or 18'. The operation of the embodiment shown in Figures 9 to 11, inclusive, is similar to the two embodiments described above except that the sheaves 19 operate to turn the cable 45, one side of the latter being fixed to the truck 35 and operating to draw the truck 35 along the track 34.

In the first two embodiments described, Figures 1 to 7, inclusive, the means 17 may be designed to obtain any desired ratio between the operating shaft 28 or 28' by providing sheaves 19 or sprocket wheels 19' of a predetermined diameter as well as providing a predetermined pitch on the worms 18 or 18'. In the case of the embodiment shown in Figure 8 to 11, inclusive, the ratio between the sheaves 19 and the trucks 35 may be varied by providing the grooves 44 with a smaller or larger diameter than the sheaves carrying the cable 26.

The cooling of an aircraft engine of the air cooled type has been more or less satisfactorily solved and it is here pointed out that while the present invention provides novel means for regulating the cooling of the engine that the means is specifically employed to reduce the drag through the engine to a minimum required to properly cool the engine. The present construction is easily and readily operable for reducing the airflow through the engine to a minimum required to properly cool the motor and in so doing the drag through the motor is correspondingly reduced. Also in case of engine trouble, and such engine becomes inoperable the airflow through the engine may be completely eliminated and greatly reduce the overall drag of a dead engine.

Another important feature of the present construction is that the means for reducing the drag through the engine as well as controlling its cooling system may be operated at all times without interfering with the slipstream about the craft. The present invention is also light in weight, simple and rugged in structure, comparatively cheap to manufacture and positive in operation.

While I have illustrated and described but certain embodiments of the invention in connection with one form of an aircraft construction it will now be apparent to those skilled in the art that the present invention may be employed in aircraft construction whenever a ring cowling is desired and that changes may be made in the particular embodiment here shown as well as substitutions and modifications without departing from the spirit and scope of the appended claims.

I claim:

1. In combination, an engine, a nacelle, a substantially cylindrical fixed cowling surrounding said engine and spaced throughout its periphery from said nacelle, the outer surface of said cowling being a substantial continuation of a portion of the outer surface of said nacelle except for the spacing therebetween, an annular member telescopically and adjustably engaging said cowling interiorly thereof, and means for moving said annular member to close the space between said cowling and said nacelle with said annular member forming therebetween a substantial continuation of said nacelle and cowling surfaces.

2. An aircraft structure including a nacelle, a cowling positioned forward of said nacelle and providing a passage therebetween, and means including an annular band member for adjusting the said passageway.

3. An aircraft structure in accordance with claim 2 wherein means is provided for moving the said band member into telescopical relation with said cowling.

PARKS M. ADAMS.